US008140701B2

(12) United States Patent
Rajan (10) Patent No.: US 8,140,701 B2
(45) Date of Patent: Mar. 20, 2012

(54) SCALABLE DYNAMIC CONTENT DELIVERY AND FEEDBACK SYSTEM

(75) Inventor: Rajeev Bashyam Rajan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 12/399,494

(22) Filed: Mar. 6, 2009

(65) Prior Publication Data
US 2010/0228874 A1 Sep. 9, 2010

(51) Int. Cl.
*G06F 15/16* (2006.01)
(52) U.S. Cl. ....................................................... 709/231
(58) Field of Classification Search .................. 709/231
See application file for complete search history.

(56) References Cited

U.S. PATENT DOCUMENTS

| 2002/0083193 | A1* | 6/2002 | Terefenko | 709/238 |
|---|---|---|---|---|
| 2003/0131073 | A1* | 7/2003 | Lucovsky et al. | 709/219 |
| 2003/0177253 | A1* | 9/2003 | Schuehler et al. | 709/230 |
| 2006/0129691 | A1* | 6/2006 | Coffee et al. | 709/230 |
| 2010/0180043 | A1* | 7/2010 | Lau et al. | 709/231 |

* cited by examiner

*Primary Examiner* — George C Neurauter
(74) *Attorney, Agent, or Firm* — Workman Nydegger (57) ABSTRACT

In an embodiment, a computer system instantiates an intermediary software application configured to intermediate between an event controller and a content delivery network (CDN). The event controller is configured to administer a real-time event involving multiple meeting participants. The CDN is configured to distribute dynamic, real-time content to a plurality of event participants. The intermediary software application joins the event as an event participant such that the intermediary software application receives a real-time stream of media content associated with the event from the event controller. The intermediary software application also transmits the received media content stream to computer systems of the CDN, where each CDN computer system is configured to distribute the real-time media content stream to the participants communicatively connected to the CDN.

19 Claims, 4 Drawing Sheets

SCALABLE DYNAMIC CONTENT DELIVERY AND FEEDBACK SYSTEM

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a client computer system might connect to a web meeting with multiple different participants. Typically, in such a scenario, each meeting participant connects to a central server that provides the web meeting content to each user. As the number of web meeting users increases, however, the meeting server experiences a substantial increase in network traffic.

BRIEF SUMMARY

Embodiments described herein are directed to delivering dynamic real-time content to a plurality of event participants over a configurable content delivery network. In one embodiment, a computer system instantiates an intermediary software application configured to intermediate between an event controller and a content delivery network (CDN). The event controller is configured to administer a real-time event involving multiple meeting participants. The CDN is configured to distribute dynamic, real-time content to a plurality of event participants. The intermediary software application joins the event as an event participant such that the intermediary software application receives a real-time stream of media content associated with the event from the event controller. The intermediary software application also transmits the received media content stream to computer systems of the CDN, where each CDN computer system is configured to distribute the real-time media content stream to the participants communicatively connected to the CDN.

Other embodiments are directed to providing a feedback mechanism that allows participants in a live event to submit real-time feedback that is presented to the other event participants. In one embodiment, a computer system provides a portion of customized software code to computer systems that are members of a content delivery network (CDN), where each CDN computer system is configured to run customized software code in addition to the CDN computer's default content distribution programming. The customized software code portion distributes dynamic, real-time media content received as a live data stream to a plurality of users communicatively connected to at least one of the CDN computer systems. The customized software code portion further receives portions of feedback from the plurality of users and aggregates the received feedback according to an aggregation policy defined in the customized software code. The customized software code portion also transmits the aggregated feedback to the event controller.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to delivering dynamic real-time content to a plurality of event participants over a configurable content delivery network. In one embodiment, a computer system instantiates an intermediary software application configured to intermediate between an event controller and a content delivery network (CDN). The event controller is configured to administer a real-time event involving multiple meeting participants. The CDN is configured to distribute dynamic, real-time content to a plurality of event participants. The intermediary software application joins the event as an event participant such that the intermediary software application receives a real-time stream of media content associated with the event from the event controller. The intermediary software application also transmits the received media content stream to computer systems of the CDN, where each CDN computer system is configured to distribute the real-time media content stream to the participants communicatively connected to the CDN.

Other embodiments are directed to providing a feedback mechanism that allows participants in a live event to submit real-time feedback that is presented to the other event participants. In one embodiment, a computer system provides a portion of customized software code to computer systems that are members of a content delivery network (CDN), where each CDN computer system is configured to run customized software code in addition to the CDN computer's default content distribution programming. The customized software code portion distributes dynamic, real-time media content received as a live data stream to a plurality of users communicatively connected to at least one of the CDN computer systems. The customized software code portion further receives portions of feedback from the plurality of users and aggregates the received feedback according to an aggregation policy defined in the customized software code. The customized software code portion also transmits the aggregated feedback to the event controller.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
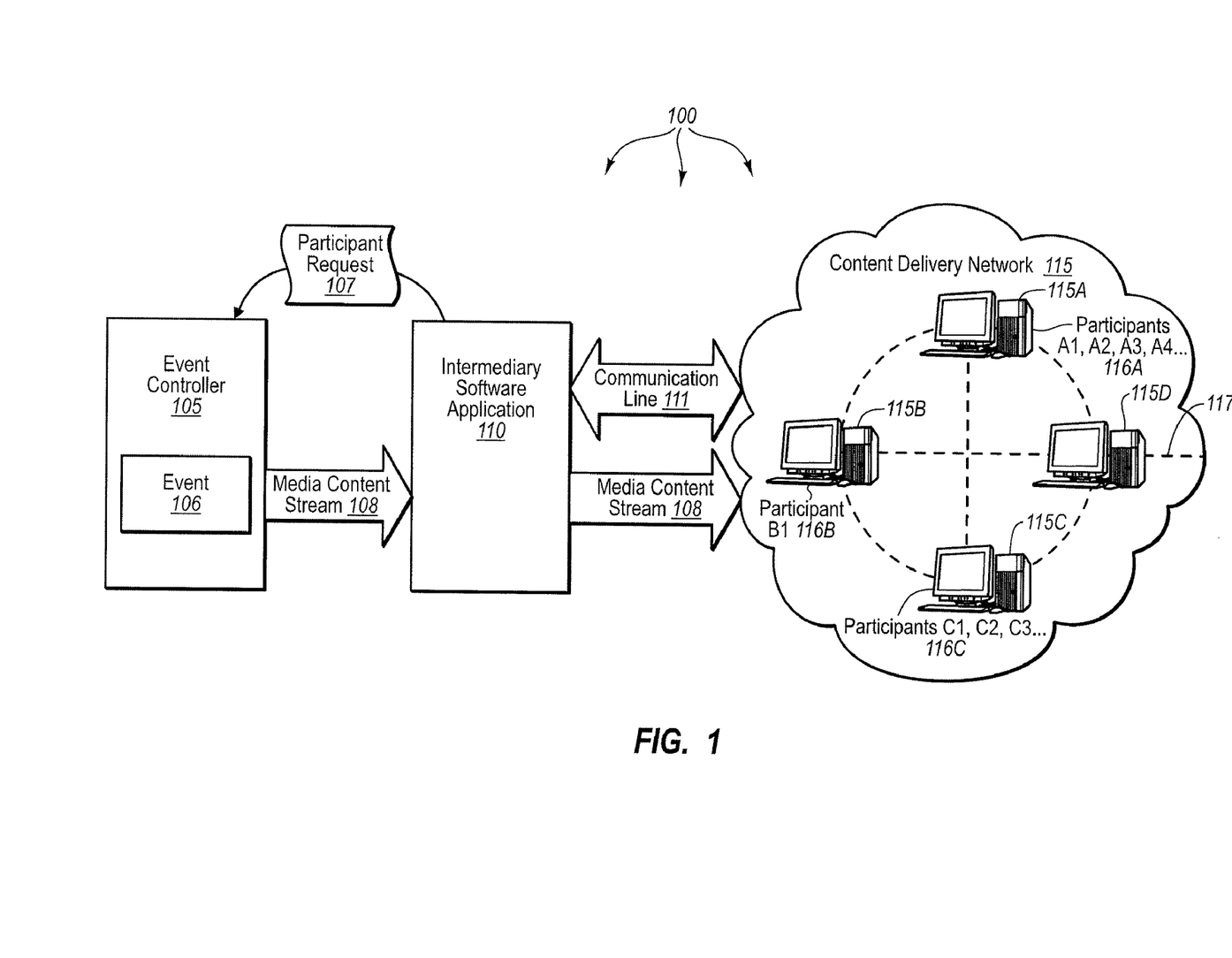
FIG. 1 illustrates a computer architecture in which embodiments of the present invention may operate including delivering dynamic real-time content to a plurality of event participants over a configurable content delivery network.

FIG. 1 illustrates a computer architecture 100 in which the principles of the present invention may be employed. Computer architecture 100 includes event controller 105. Event controller 105 may be any type of computer system or computer system component configured to manage and operate an event. Event controller 105 may be configured to function as a (web) content server, providing event content to various event participants. Event controller 105 may run multiple different events, including event 106. These events may be run simultaneously and may include the same or different participants. As used herein, events refer to sessions, meetings, online gatherings, or other forums where computer users meet to share in a common communication.

In one embodiment, event 106 may be a live web meeting, attended by many different participants. It should be noted that, as used herein, "attending" may refer to a participant's physical presence at the meeting, or more often, may refer to a user participating over a network connection. Such participation may include viewing the meeting content, hearing the audio portion, sending and receiving feedback or other communications, and/or other types of participation. In some cases, intermediary software application 110 may be configured to send a request 107 to participate in event 106 as a participant. Upon adding application 110 as a participant, event controller 105 may send media content stream 108 to intermediary software application 110. Application 110 may simply pass media content stream 108 to content delivery network 115, or application 110 may perform some type of processing on the media stream, as will be explained in greater detail below.

As used herein, a media content stream may refer to a series of data packets that include content associated with the corresponding event. For instance, as illustrated in FIG. 1, media content stream 108 may comprise a stream of data packets that relay audio, video or other event information of event 106. Thus, media content stream 108 comprises a substantially constant flow of information, such that participants can get the feel of being physically present at the meeting. As indicated above, intermediary software application 110 may join event 106 as a participant and receive the same media content stream that would be sent to other users connected as event participants.

Upon receiving media content stream 108, and after performing any optional processing on the stream, intermediary software application 110 may send the content stream to content delivery network 115. As used herein, content delivery networks (CDNs) are networks of computer systems physically dispersed throughout a geographical region configured to store and provide web or other content to those users that are physically, geographically near to each CDN computer system. Accordingly, when a user requests to view a web page or other content, at least some of the web page's content may be provided by a geographically close CDN computer.

Content delivery network 115 includes computer systems 115A-D, which are all capable of communicating with each other, as designated by the dotted lines between the systems. Furthermore, as designated by the dotted lines 117, many more CDN computer systems may be part of the content delivery network. Indeed, although CDN 115 is illustrated as having four computer systems, it should be understood that CDN 115 may include substantially any number of computer systems, fewer or greater than four.

Each CDN computer system may have one or more users connected to it, or otherwise assigned to them because of the user's geographical location relative to the CDN computer system. Accordingly, as illustrated in FIG. 1, CDN computer system 115A may have participants A1, A2, A3 and A4 (116A), CDN computer system 115B may have participant B1 (116B), CDN computer system 115C may have participants C1, C2, C3 (116C) and CDN computer system 115D may have no current participants. As with the number of CDN computer systems in CDN 115, each CDN computer system may have substantially any number of participants. If one CDN computer system becomes overburdened, load balancing techniques may be implemented to share users across other nodes of the CDN. Participants may communicate with other event participants by sending feedback and other information via communication line 111 to intermediary software application 110. Application 110 may then relay this information to event controller 105. These and other aspects will be explained in greater detail below with regard to methods 200 and 300 of FIGS. 2 and 3, an further in view of computer architecture 400 of FIG. 4.

Figure 2:
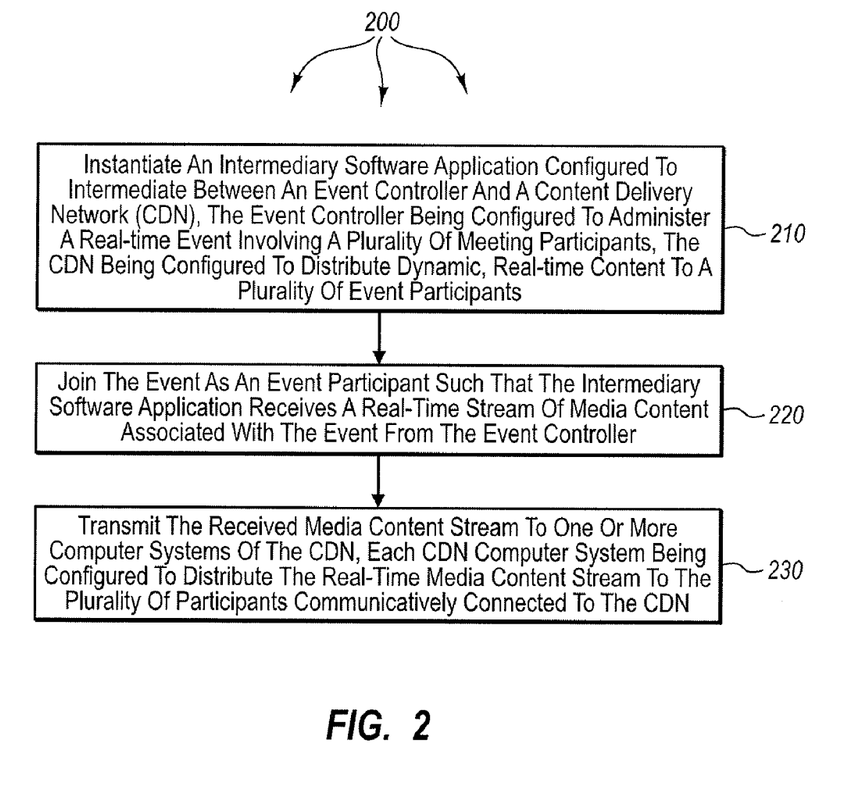
FIG. 2 illustrates a flowchart of an example method for delivering dynamic real-time content to a plurality of event participants over a configurable content delivery network.

FIG. 2 illustrates a flowchart of a method 200 for delivering dynamic real-time content to a plurality of event participants over a configurable content delivery network. The method 200 will now be described with frequent reference to the components and data of environment 100.

Method 200 includes an act of instantiating an intermediary software application configured to intermediate between an event controller and a content delivery network (CDN), the event controller being configured to administer a real-time event involving a plurality of meeting participants, the CDN being configured to distribute dynamic, real-time content to a plurality of event participants (act 210). For example, a computer system may instantiate intermediary software application 110 which is configured to intermediate between event controller 105 and CDN 115. Event controller 105 may be configured to administer real-time event 106 involving a variety of different meeting participants. CDN 115 may be configured to distribute dynamic, real-time content to those meeting participants that are currently connected as meeting participants as well as those that join after the meeting has begun. It should be noted that CDN 115 is scalable to provide the media content stream to substantially any number of event participants distributed across the CDN. Accordingly, large, world-wide, state-wide, city-wide, corporation-wide or other very large web conferences or other broadcast meetings may be distributed by CDN 115.

In some embodiments, the CDN computer systems (e.g. 115A-D) are configured to run a customized software module designed to distribute the received real-time content stream 108 to the plurality of event participants (e.g. 116A-C). In some cases, CDN 115, by default, may not be configured to distribute content other than static content. Accordingly, as will be explained in greater detail with regard to FIG. 4, a customized software module may be installed on the CDN computer systems that allows the CDN computer systems to distribute dynamic, real-time content.

In some cases, a customized software module running on a CDN computer system may be configured to format the received media content stream on-the-fly before distributing the media content stream to the event participants. Additionally or alternatively, the customized software module running on the CDN computer systems may be configured to buffer the received media content stream on-the-fly before distributing the media content stream to the event participants. Accordingly, the customized software module may provide additional functionality to the CDN computer systems. It should also be recognized that intermediary software application 110 may perform any or all of the functionality described above in association with the customized software module. Thus, application 110 and the customized software module may work separately or in tandem to effectuate a desired result (e.g. buffering, encoding, formatting, etc.).

In some embodiments, event participants may be required to log in to view or otherwise participate in the event. In such cases, intermediary software application 110 may be configured to forward any received user login credentials received from participants connected to CDN computer systems to event controller 105. Accordingly, event controller 105 can use the received login credentials to log the users in such that they can participate in the event. Event controller 105 may send a notification to the participants notifying them that the login was successful. This notification may likewise be forwarded by the intermediary software application to the CDN computer systems and corresponding participants.

Method 200 includes an act of the intermediary software application joining the event as an event participant such that the intermediary software application receives a real-time stream of media content associated with the event from the event controller (act 220). For example, intermediary software application 110 may join event 106 as an event participant so that application 110 can receive real-time media content stream 108 from event controller 105. This media content stream is, at least in some embodiments, the same content stream that would be sent to the other participants. Accordingly, event controller 105 may be unaware that intermediary software application 110 is not a typical participant, but rather an application or software module configured to take the media content stream and transmit it to a content delivery network for broad distribution. As mentioned above, application 110 may perform various types of processing on the content stream before transmitting the stream including encoding the content stream into a single byte stream for transmission to the CDN. Intermediary software application may further apply compression algorithms to compress the single byte stream before transmission.

Method 200 also includes an act of the intermediary software application transmitting the received media content stream to one or more computer systems of the CDN, each CDN computer system being configured to distribute the real-time media content stream to the plurality of participants communicatively connected to the CDN (act 230). For example, intermediary software application 110 may transmit media content stream 108 to one or more of CDN computer systems 115A-115D, where each CDN computer system is configured to distribute the real-time media content stream 108 to those participants 116A-C that are communicatively connected to the content delivery network. In some embodiments, intermediary software application 110 may be configured to collect portions of feedback received from participants via the CDN computer systems. Upon collecting this feedback, application 110 may send the collected feedback to the event controller 105 for presentation to the other event participants. Receiving and processing participant feedback will be explained in greater detail below with regard to FIGS. 3 and 4.

Figure 3:
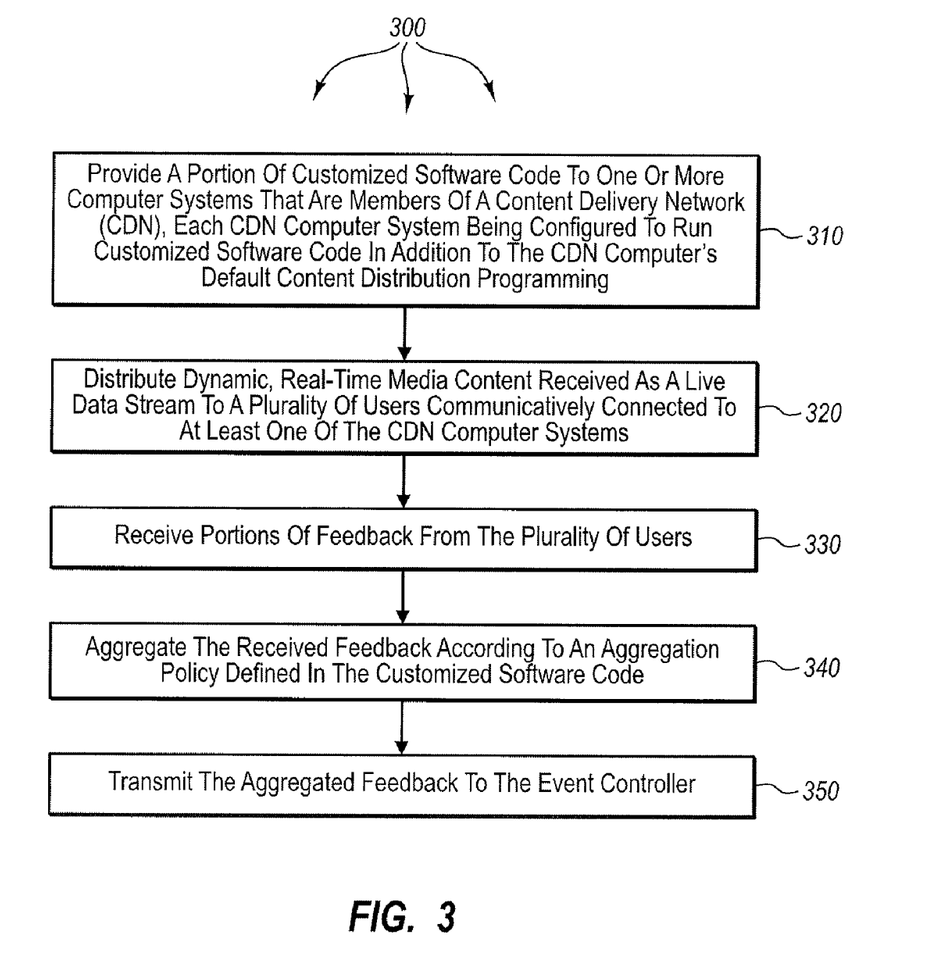
FIG. 3 illustrates a flowchart of an example method for providing a feedback mechanism that allows participants in a live event to submit real-time feedback that is presented to the other event participants.

FIG. 3 illustrates a flowchart of a method 300 for providing a feedback mechanism that allows participants in a live event to submit real-time feedback that is presented to the other event participants. The method 300 will now be described with frequent reference to the components and data of environments 100 of FIG. 1 and 400 of FIG. 4.

Method 300 includes an act of providing a portion of customized software code to one or more computer systems that are members of a content delivery network (CDN), each CDN computer system being configured to run customized software code in addition to the CDN computer's default content distribution programming (act 310). For example, a computer system or computer user may provide customized software code portion 425 to one or more content delivery network computer systems (e.g. 415) that are members of content delivery network 115. CDN computer system 415 may be configured to run one or more customized software code portions (e.g. 425) in addition to CDN computer system 415's default content distribution programming 420. This additional software code may be installed in variety of manners including, manually by a user, automatically downloaded from a network such as the internet, downloaded as a result of a user request, or by some other method. It should be noted that like numbers in FIGS. 1 and 4 may indicate that the elements are the same (e.g. media content streams 108 and 408), but the elements do not necessarily have to be the same. For instance, media content streams 108 and 408 could refer to different types or formats of media content streams.

Figure 4:
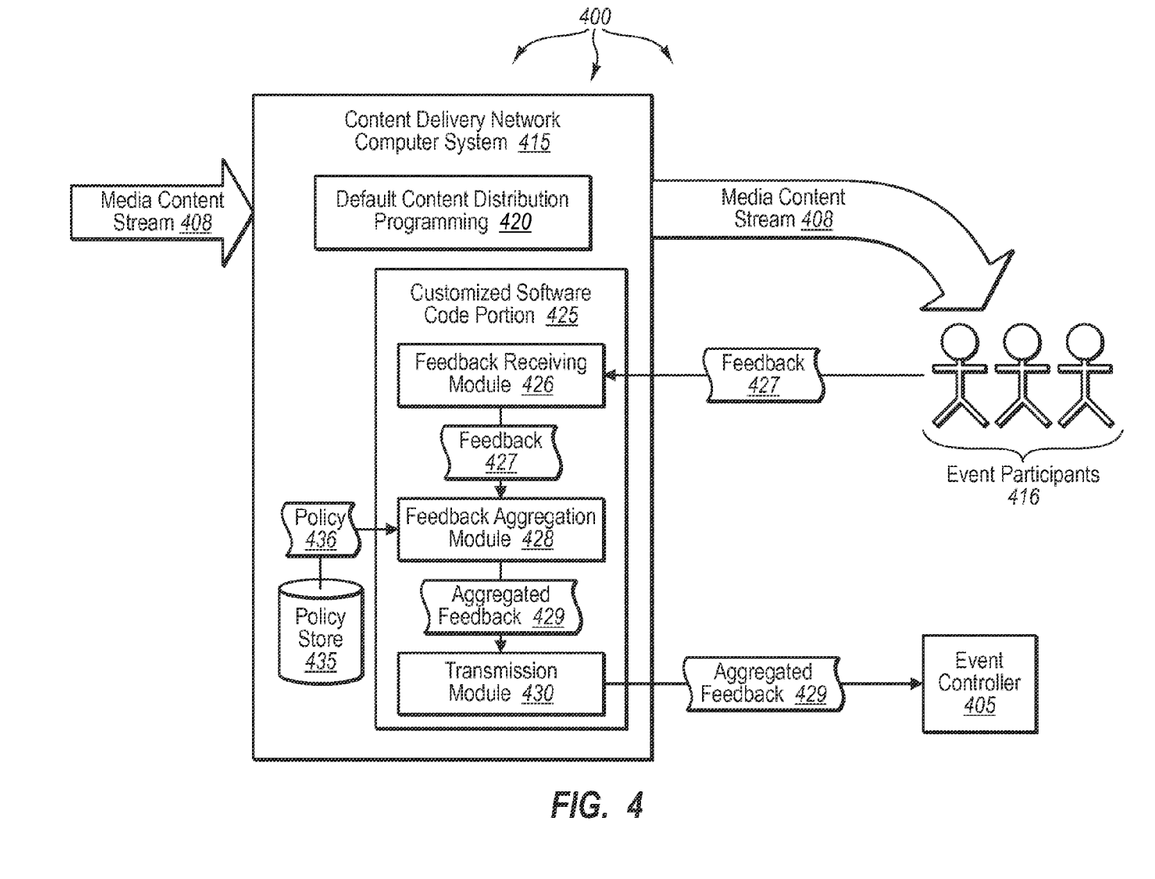
FIG. 4 illustrates an embodiment of a content delivery network computer system.

Method 300 also includes an act of the customized software code portion distributing dynamic, real-time media content received as a live data stream to a plurality of users communicatively connected to at least one of the CDN computer systems (act 320). For example, customized software code portion 425 may distribute dynamic, real-time media content received as live data stream 408 to event participants 416. These event participants may receive the content stream and participate as if they were attending the event.

Method 300 includes an act of the customized software code portion receiving one or more portions of feedback from the plurality of users (act 330). For example, feedback receiving module 426 of customized software code portion 425 may receive feedback 427 from event participants 416. Participant feedback 427 may include any type of information including a question, an answer to a proposed question, a vote, a selection of one or more proposed options, a poll response or any other type of response. The feedback may be in any form including textual, audio, video, application-based (as in selecting a radio-button to indicate a response, or in any combination thereof. Thus, in the example where the event is a live web conference, participants 416 may be able to interact with a meeting presenter or other participants using feedback. The feedback may be aggregated by the customized software code portion 425, or alternatively, by intermediary software application 110.

Method 300 includes an act of the customized software code portion aggregating the received feedback according to an aggregation policy defined in the customized software code (act 340). For example, feedback aggregation module 428 of customized software code portion 425 may aggregate the received feedback 427 according to aggregation policy 436. Aggregation policy 436 may be stored in and part of customized software code portion 425. Additionally or alternatively, aggregation policy 436 (and other such policies) may be stored in policy store 435 which is accessible by customized software code portion 425.

In some cases, the aggregation policy 436 is contextual, such that different forms of feedback aggregation are used with different types of feedback. For instance, for poll responses, feedback may be aggregated such that all of the participant responses received before a specified cutoff time are combined together for presentation in a graph or other form indicating the number of responses for each poll option. In other cases, such as audio/video user responses to questions, the audio/video responses may be queued and presented in sequential order. It will be understood that many such variations are possible, and, as a result, the aggregation policy is dynamically changeable to aggregate feedback in a different manner depending on which type of feedback is received.

Along these lines, different forms of feedback aggregation may be used with different types of participants. Accordingly, feedback from participants 116A may be aggregated in a different manner than feedback from participants 116B. The form of aggregation used may be based on group size, location of the participants, participant class types (e.g. participants assigned to different work departments (management, human resources, information technology, etc.)) or other forms of contextual information. The context information may change as the group changes, resulting in changes to the form of feedback aggregation. In some cases, the type of feedback aggregation may be assigned to the various CDN computer systems. Accordingly, two or more CDN computer systems may have different aggregation policy properties, resulting in the feedback from a first group of users being aggregated in a different manner than feedback from a second group of users. The aggregation policy may be dynamically updatable by the event controller 105.

In some embodiments, custom CDN edge nodes may be implemented in addition to the CDN computer systems. The custom CDN edge nodes may be configured to accelerate feedback aggregation due to the edge nodes' close physical location to the event participants.

Method 300 includes an act of the customized software code portion transmitting the aggregated feedback to the event controller (act 350). For example, transmission module 430 of customized software code portion 425 may be configured to transmit aggregated feedback 429 to event controller 405. Event controller 405 may then perform some type of post-processing to prepare the aggregated feedback for presentation to the event participants. Upon determining that the post-processing (if any) has been completed, event controller 405 may present the data to the users in any suitable form including audio, video, slideshow presentation, or other form of presentation. This presentation may be transmitted along with the live meeting content stream to the various event participants. In some cases, the feedback aggregated at each CDN computer system (e.g. 115A-115D and 415) may be transmitted to intermediary software application 110 which is configured to collect feedback from a multiple different CDN computer systems and forward the collected feedback to event controller 405.

Accordingly, a software application may join an event as a participant and send the received media content stream to a customized content delivery network for distribution to a large group of event participants. Because the content delivery network is scalable to provide a media content stream to substantially any number of simultaneous users, a live web conference or other event may be provided to a large number of participants geographically dispersed throughout the world.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for scalable delivery of a real-time media content stream for an event involving a plurality of participants which are logically interconnected through a content delivery network (CDN) comprised of a plurality of CDN computing systems which each serve one or more participants in the event, the real-time media content stream being provided by an event controller, and the method comprising:
   an act of instantiating one or more intermediary software applications which are each configured to intermediate between an event controller and a content delivery network (CDN);
   an act of one or more of the intermediary software applications joining the event as an event participant, each intermediary software application joining the event receiving from the event controller, in real time, a complete media content stream of the event as it is transpiring; and
   an act of the one or more intermediary software applications directly transmitting in real time the received media content stream, without caching or reassembly, to one or more computer systems of the CDN for real-time distribution to the plurality of participants;
   an act of the one or more intermediary software applications receiving real-time responsive communications from one or more event participants within the CDN;
   an act of the one or more intermediary software applications receiving such real-time responsive communications aggregating the responsive communications in accordance with an aggregation policy; and
   an act of transmitting the aggregated responsive communications from one or more of the intermediary software applications to the event controller which then includes the aggregated responsive communications in an updated media content stream transmitted to the one or more intermediary software applications for subsequent distribution to the CDN computing systems.

2. The method of claim 1, wherein the CDN computer systems are configured to run a customized software module designed to distribute the received real-time content stream to the plurality of event participants.

3. The method of claim 2, wherein the customized software module running on the CDN computer systems is configured to format the received media content stream on-the-fly before distributing the media content stream to the plurality of participants.

4. The method of claim 2, wherein the customized software module running on the CDN computer systems is configured to buffer the received media content stream on-the-fly before distributing the media content stream to the plurality of participants.

5. The method of claim 1, further comprising an act of the intermediary software application encoding the media content stream into a single byte stream for transmission to the CDN.

6. The method of claim 5, wherein the single byte stream including the media content stream is compressed before transmission to the CDN.

7. The method of claim 1, wherein by increasing the number of intermediate software applications joining as participants, the CDN is scalable to provide the media content stream to substantially any number of event participants distributed across the CDN.

8. The method of claim 7, wherein the event comprises a live web conference.

9. The method of claim 1, wherein the one or more intermediary software applications forwards any user login credentials received from CDN computer systems to the event controller.

10. The method of claim 1, wherein the one or more intermediary software applications are each configured to collect portions of feedback received from users via the CDN computer systems.

11. The method of claim 10, further comprising an act of the one or more intermediary software applications sending the collected feedback to the event controller for presentation to the other event participants.

12. A computer program product for implementing a method for scalable delivery of a real-time media content stream for an event involving a plurality of participants which are logically interconnected through a content delivery network (CDN) comprised of a plurality of CDN computing systems which each serve one or more participants in the event, the real-time media content stream being provided by an event controller, and the computer program product comprising computer readable memory having stored thereon computer-executable instructions that, when executed by one or more processors of the computing system, cause the computing system to perform the method, and wherein the method comprises:
   an act of launching one or more intermediary software applications which are each configured to manage delivery of a media content stream for an event between an event controller and a content delivery network (CDN);
   an act of one or more of the intermediary software applications joining the event as an event participant, each intermediary software application joining the event receiving from the event controller, in real time, the complete media content stream of the event as it is transpiring;
   an act of the one or more intermediary software applications directly transmitting in real time the received media content stream, without caching or reassembly, to one or more computer systems of the CDN for real-time distribution to participants in the event;
   an act of providing customized software code to one or more computer systems that are members of a CDN;
   an act of the customized software code receiving feedback in the form of one or more kinds of responsive communications from one or more of the participants in the event;
   an act of the customized software code aggregating the received feedback according to an aggregation policy accessed by the customized software code;
   an act of the customized software code transmitting the aggregated feedback to at least one intermediary software application that has joined the event as a participant; and
   an act of transmitting the aggregated feedback from the at least one intermediary software application to the event controller which then includes the aggregated responsive communications in an updated media content stream transmitted back out to the one or more intermediary software applications for redistribution to the CDN network's computing systems.

13. The computer program product of claim 12, wherein the feedback comprises at least one of a question, an answer to a proposed question, a vote, a selection of one or more proposed options and a poll response.

14. The computer program product of claim 13, wherein the aggregation policy is contextual, such that different forms of feedback aggregation are used with different types of feedback.

15. The computer program product of claim 13, wherein the aggregation policy is contextual, such that different forms of feedback aggregation are used with different types of participants.

16. The computer program product of claim 12, wherein the CDN includes one or more custom CDN edge nodes in addition to the one or more CDN computer systems, and wherein the custom CDN edge nodes are configured to accelerate feedback aggregation.

17. The computer program product of claim 12, wherein two or more of the CDN computer systems have different aggregation policy rules, such that the feedback from a first group of participants is aggregated in a different manner than feedback from a second group of participants.

18. The computer program product of claim 12, wherein the aggregation policy is dynamically updatable by the event controller.

19. A computer program product for implementing a method for scalable delivery of a real-time media content stream for an event involving a plurality of participants which are logically interconnected through a content delivery network (CDN) comprised of a plurality of CDN computing systems which each serve one or more participants in the event, the real-time media content stream being provided by an event controller, and the computer program product comprising computer readable memory having stored thereon computer-executable instructions that, when executed by one or more processors of the computing system, cause the computing system to perform the method, and wherein the method comprises:

an act of instantiating one or more intermediary software applications which are each configured to intermediate between an event controller and a content delivery network (CDN);

an act of one or more of the intermediary software applications joining the event as an event participant, each intermediary software application joining the event receiving from the event controller, in real time, a complete media content stream of the event as it is transpiring;

an act of the one or more intermediary software applications directly transmitting in real time the received media content stream, without caching or reassembly, to one or more computer systems of the CDN for real-time distribution to the plurality of participants;

an act of the one or more intermediary software applications receiving real-time responsive communications back from one or more participants receiving the media content stream for the event;

an act of the one or more intermediary software applications receiving such real-time responsive communications aggregating the responsive communications in accordance with an aggregation policy; and an act of transmitting the aggregated responsive communications from one or more of the intermediary software applications to the event controller which then includes the aggregated responsive communications in an updated media content stream transmitted back out to the one or more intermediary software applications for redistribution to the CDN network's computing systems.

* * * * *

UNITED STATES PATENT AND TRADEMARK OFFICE
CERTIFICATE OF CORRECTION

PATENT NO. : 8,140,701 B2
APPLICATION NO. : 12/399494
DATED : March 20, 2012
INVENTOR(S) : Rajeev Bashyam Rajan It is certified that error appears in the above-identified patent and that said Letters Patent is hereby corrected as shown below:

In the Claims

In column 9, line 20, In Claim 1, delete "real time" and insert -- real-time --, therefor.

In column 9, line 24, In Claim 1, delete "real time" and insert -- real-time --, therefor.

In column 10, line 36, In Claim 12, delete "real time" and insert -- real-time --, therefor.

In column 10, line 40, In Claim 12, delete "real time" and insert -- real-time --, therefor.

In column 12, line 8, In Claim 19, delete "real time" and insert -- real-time --, therefor.

In column 12, line 12, In Claim 19, delete "real time" and insert -- real-time --, therefor.

Signed and Sealed this
Nineteenth Day of May, 2015

Michelle K. Lee
*Director of the United States Patent and Trademark Office*